(12) United States Patent
Yeh et al.

(10) Patent No.: US 11,743,232 B2
(45) Date of Patent: Aug. 29, 2023

(54) SOFTWARE DEFINED BRANCH SINGLE INTERNET PROTOCOL ORCHESTRATION

(71) Applicant: Cisco Technology, Inc., San Jose, CA (US)

(72) Inventors: Alexander Yeh, San Jose, CA (US); Yanping Qu, Fremont, CA (US); Kaushik Pratap Biswas, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 17/388,914

(22) Filed: Jul. 29, 2021

(65) Prior Publication Data

US 2022/0329563 A1 Oct. 13, 2022

Related U.S. Application Data

(60) Provisional application No. 63/172,494, filed on Apr. 8, 2021.

(51) Int. Cl.
*H04L 61/5007* (2022.01)
*H04L 43/0811* (2022.01)
*H04L 12/46* (2006.01)

(52) U.S. Cl.
CPC ...... *H04L 61/5007* (2022.05); *H04L 12/4633* (2013.01); *H04L 43/0811* (2013.01)

(58) Field of Classification Search
CPC ............ H04L 61/2007; H04L 12/4633; H04L 43/0811
See application file for complete search history.

(56) References Cited

U.S. PATENT DOCUMENTS

| | | | |
|---|---|---|---|
| 10,728,288 B2 * | 7/2020 | Miriyala | G06F 21/606 |
| 11,171,834 B1 * | 11/2021 | Bockelmann | G06F 9/44505 |
| 11,374,791 B2 * | 6/2022 | Vadde Makkalla | H04L 45/74 |
| 2015/0381567 A1 * | 12/2015 | Johnson | H04L 63/0227 726/12 |
| 2016/0191304 A1 * | 6/2016 | Muller | H04L 45/586 370/220 |
| 2017/0118067 A1 * | 4/2017 | Vedula | H04L 43/10 |
| 2018/0293363 A1 * | 10/2018 | Asati | G06F 21/12 |
| 2018/0349033 A1 | 12/2018 | Kapadia et al. | |
| 2018/0373558 A1 | 12/2018 | Chang et al. | |
| 2020/0036577 A1 * | 1/2020 | Bhagvath | H04L 41/0668 |
| 2020/0287976 A1 * | 9/2020 | Theogaraj | H04L 67/51 |
| 2020/0314006 A1 | 10/2020 | Mackie et al. | |
| 2021/0006473 A1 | 1/2021 | Chitalia et al. | |
| 2021/0067408 A1 | 3/2021 | Vaidya et al. | |

* cited by examiner

*Primary Examiner* — Younes Naji
(74) *Attorney, Agent, or Firm* — Polsinelli

(57) ABSTRACT

Systems, methods, and computer-readable media are provided for software defined branch single IP orchestration. An example method can include establishing, by a controller, a secure tunnel agent to an orchestrator, generating, by the controller, a single IP address on a virtual router for a virtual branch site, and monitoring, by the controller, reachability of the single IP address on the virtual router.

15 Claims, 10 Drawing Sheets

SOFTWARE DEFINED BRANCH SINGLE INTERNET PROTOCOL ORCHESTRATION

CROSS-REFERENCE TO RELATED APPLICATIONS

This application claims priority to U.S. Provisional Patent Application No. 63/172,494, filed on Apr. 8, 2021, the content of which is incorporated herein by reference in its entirety.

TECHNICAL FIELD

The present technology relates to network orchestration, and more particularly to software defined branch single internet protocol (IP) orchestration.

BACKGROUND

Virtual networks are often in place of physical networks. These virtual networks can experience connectivity issues. For example, it is possible for a virtual router to be healthy, while simultaneously losing connectivity to an orchestrator and/or the rest of the virtual network. When this occurs, the branch sites on the virtual routers are unreachable and unrecoverable.

BRIEF DESCRIPTION OF THE FIGURES

To provide a more complete understanding of the present disclosure and features and advantages thereof, reference is made to the following description, taken in conjunction with the accompanying drawings, in which.

DESCRIPTION OF EXAMPLE EMBODIMENTS

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods, and computer-readable media are provided for software defined branch single IP orchestration. An example method can include establishing, by a controller, a secure tunnel agent to an orchestrator, generating, by the controller, a single IP address on a virtual router for a virtual branch site, and monitoring, by the controller, reachability of the single IP address on the virtual router.

An example system can include one or more processors and at least one computer-readable storage medium storing instructions which, when executed by the one or more processors, cause the one or more processors to establish, by a controller, a secure tunnel agent to an orchestrator, generate, by the controller, a single IP address on a virtual router for a virtual branch site, and monitoring, by the controller, reachability of the single IP address on the virtual router.

An example non-transitory computer-readable storage medium having stored therein instructions which, when executed by a processor, cause the processor to establish, by a controller, a secure tunnel agent to an orchestrator, generate, by the controller, a single IP address on a virtual router for a virtual branch site, and monitoring, by the controller, reachability of the single IP address on the virtual router.

EXAMPLE EMBODIMENTS

Figure 1:
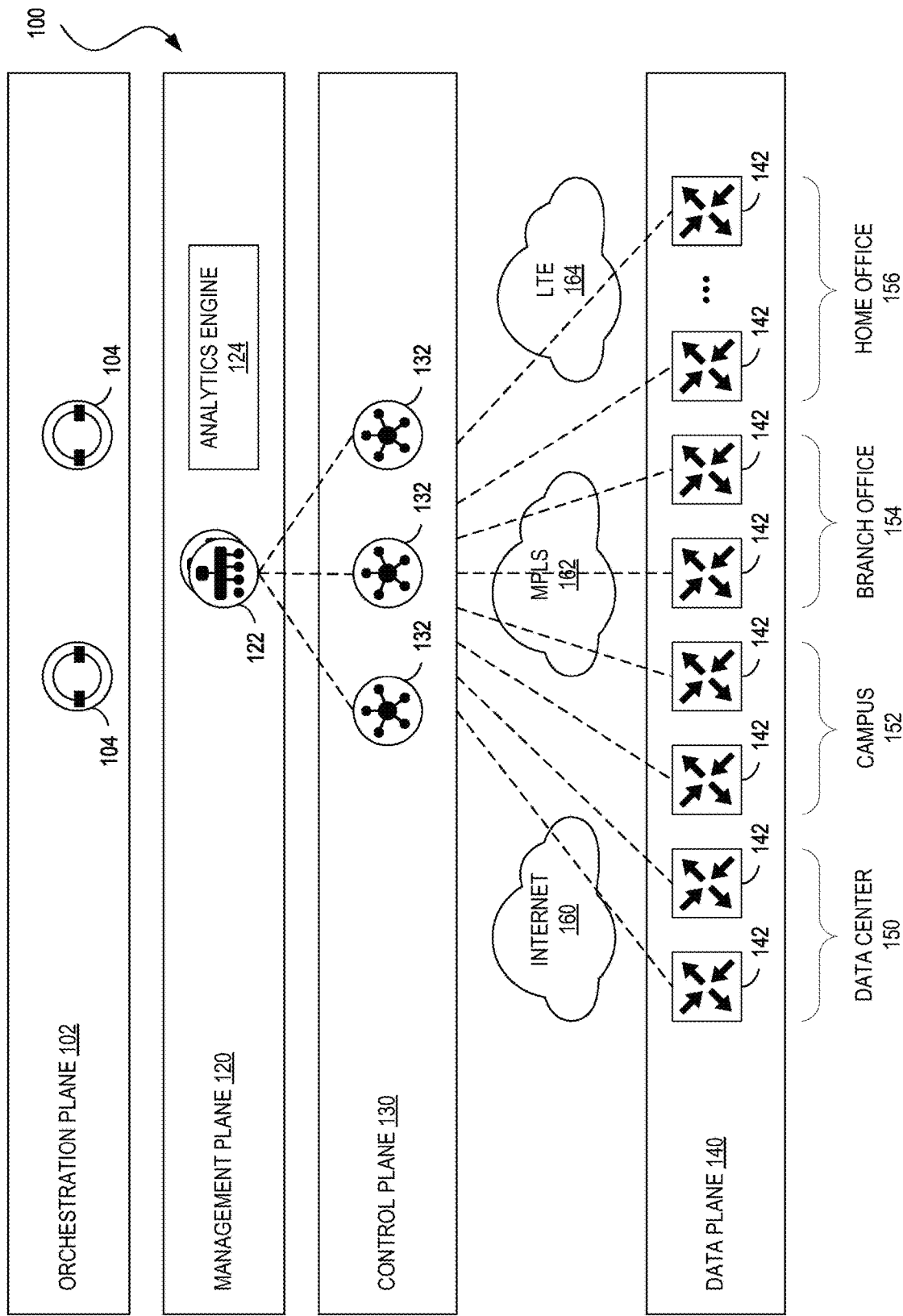
FIG. 1 illustrates an example high-level network architecture, in accordance with an embodiment of the present disclosure.

FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122 and an analytics engine 124. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
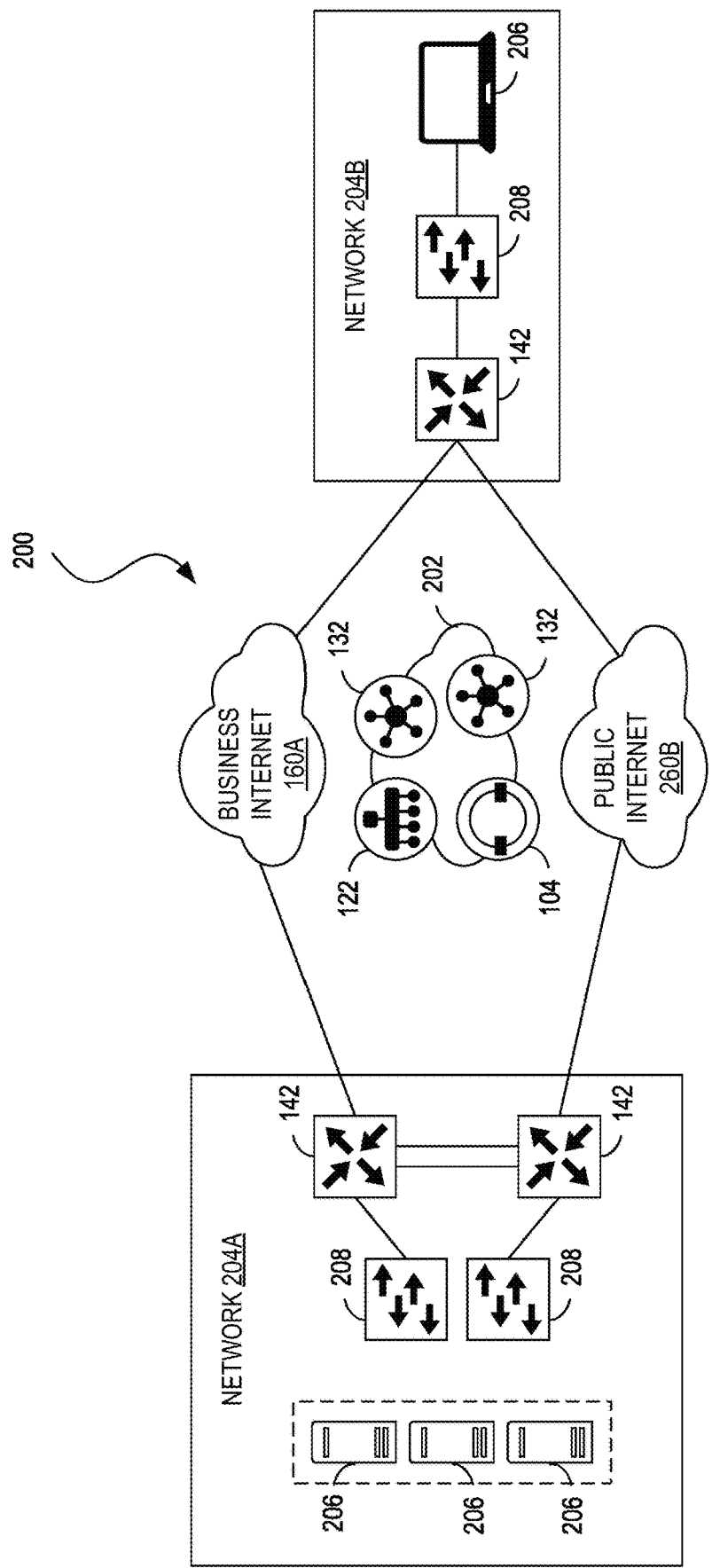
FIG. 2 illustrates an example network topology, in accordance with an embodiment of the present disclosure.

FIG. 2 illustrates an example of a network topology 200 for showing various aspects of the network architecture 100. The network topology 200 can include a management network 202, a pair of network sites 204A and 204B (collectively, 204) (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
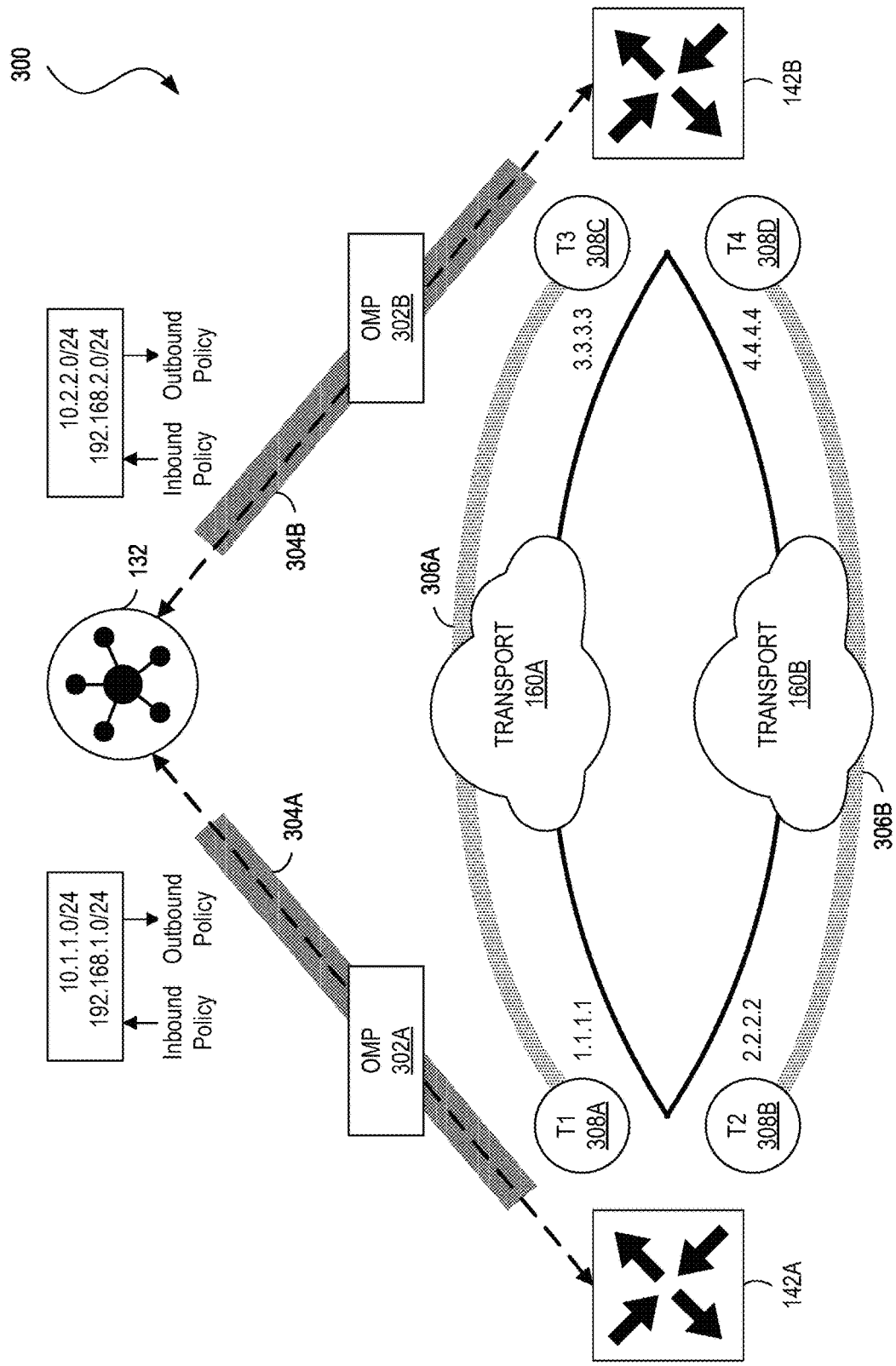
FIG. 3 illustrates an example diagram showing an operation of a protocol for managing an overlay network, in accordance with an embodiment of the present disclosure.

FIG. 3 illustrates an example of a diagram 300 showing the operation of OMP, which may be used in some embodiments to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

OMP can advertise three types of routes:

OMP routes, which can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

TLOC routes, which can correspond to logical tunnel termination points on the edge network devices 142 that connect into the transport networks 160. In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport network 160A and an IPSec tunnel 306B established between TLOC 308B and TLOC 308D over the WAN transport network 160B. Once the IPSec tunnels 306A and 306B are established, BFD can be enabled across each of them.

Figure 4:
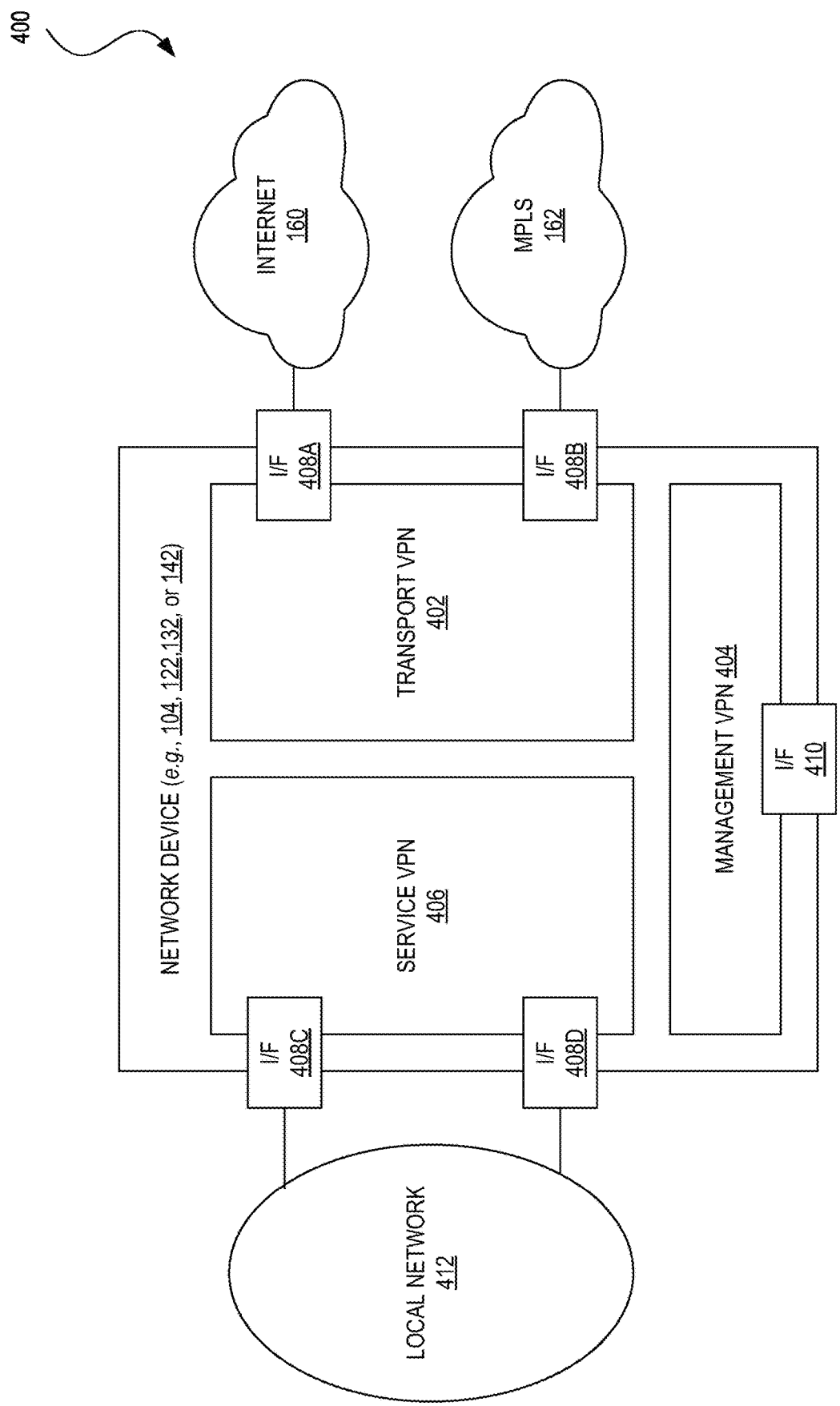
FIG. 4 illustrates an example diagram showing an operation of virtual private networks for segmenting a network, in accordance with an embodiment of the present disclosure.

FIG. 4 illustrates an example of a diagram 400 showing the operation of VPNs, which may be used in some embodiments to provide segmentation for a network (e.g., the network architecture 100). VPNs can be isolated from one another and can have their own forwarding tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some embodiments, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 410A and 410B) that respectively connect to WAN transport networks (e.g., the MPLS network 162 and the Internet transport network 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410C. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 410D and 410E) that connect to one or more local-site networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 410A-E (collectively, 410) are shown to be physical interfaces in this example, one of ordinary skill in the art will appreciate that the interfaces 410 in the transport and service VPNs can also be sub-interfaces instead.

Figure 5:
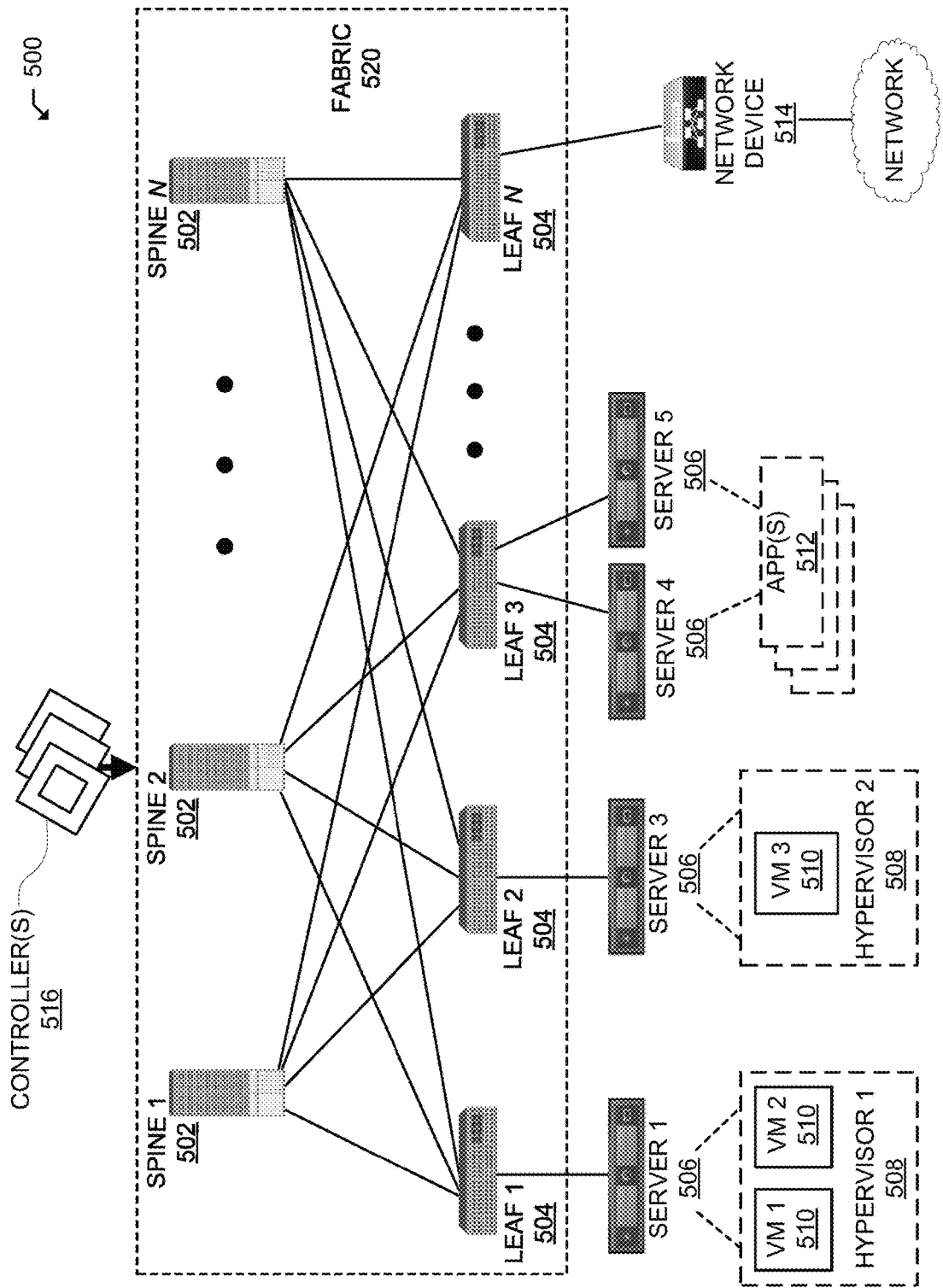
FIG. 5 illustrates an example diagram of a network environment, such as a data center, in accordance with an embodiment of the present disclosure.

FIG. 5 illustrates a diagram of an example Network Environment 500, such as a data center. In some cases, the Network Environment 500 can include a data center, which can support and/or host a cloud. The Network Environment 500 can include a Fabric 520 which can represent the physical layer or infrastructure (e.g., underlay) of the Network Environment 500. Fabric 520 can include Spines 502 (e.g., spine routers or switches) and Leafs 504 (e.g., leaf routers or switches) which can be interconnected for routing or switching traffic in the Fabric 520. Spines 502 can interconnect Leafs 504 in the Fabric 520, and Leafs 504 can connect the Fabric 520 to an overlay or logical portion of the Network Environment 500, which can include application services, servers, virtual machines, containers, endpoints, etc. Thus, network connectivity in the Fabric 520 can flow from Spines 502 to Leafs 504, and vice versa. The interconnections between Leafs 504 and Spines 502 can be redundant (e.g., multiple interconnections) to avoid a failure in routing. In some embodiments, Leafs 504 and Spines 502 can be fully connected, such that any given Leaf is connected to each of the Spines 502, and any given Spine is connected to each of the Leafs 504. Leafs 504 can be, for example, top-of-rack ("ToR") switches, aggregation switches, gateways, ingress and/or egress switches, provider edge devices, and/or any other type of routing or switching device.

Leafs 504 can be responsible for routing and/or bridging tenant or customer packets and applying network policies or rules. Network policies and rules can be driven by one or more Controllers 516, and/or implemented or enforced by one or more devices, such as Leafs 504. Leafs 504 can connect other elements to the Fabric 520. For example, Leafs 504 can connect Servers 506, Hypervisors 508, VMs 510, Applications 512, Network Device 514, etc., with Fabric 520. Such elements can reside in one or more logical or virtual layers or networks, such as an overlay network. In some cases, Leafs 504 can encapsulate and decapsulate packets to and from such elements (e.g., Servers 506) in order to enable communications throughout Network Environment 500 and Fabric 520. Leafs 504 can also provide any other devices, services, tenants, or workloads with access to Fabric 520. In some cases, Servers 506 connected to Leafs 504 can similarly encapsulate and decapsulate packets to and from Leafs 504. For example, Servers 506 can include one or more virtual switches or routers or tunnel endpoints for tunneling packets between an overlay or logical layer hosted by, or connected to, Servers 506 and an underlay layer represented by Fabric 520 and accessed via Leafs 504.

Applications 512 can include software applications, services, containers, appliances, functions, service chains, etc. For example, Applications 512 can include a firewall, a database, a CDN server, an IDS/IPS, a deep packet inspection service, a message router, a virtual switch, etc. An application from Applications 512 can be distributed, chained, or hosted by multiple endpoints (e.g., Servers 506, VMs 510, etc.), or may run or execute entirely from a single endpoint.

VMs 510 can be virtual machines hosted by Hypervisors 508 or virtual machine managers running on Servers 506. VMs 510 can include workloads running on a guest operating system on a respective server. Hypervisors 508 can provide a layer of software, firmware, and/or hardware that creates, manages, and/or runs the VMs 510. Hypervisors 508 can allow VMs 510 to share hardware resources on Servers 506, and the hardware resources on Servers 506 to appear as multiple, separate hardware platforms. Moreover, Hypervisors 508 on Servers 506 can host one or more VMs 510.

In some cases, VMs 510 can be migrated to other Servers 506. Servers 506 can similarly be migrated to other physical locations in Network Environment 500. For example, a server connected to a specific leaf can be changed to connect to a different or additional leaf Such configuration or deployment changes can involve modifications to settings, configurations and policies that are applied to the resources being migrated as well as other network components.

In some cases, one or more Servers 506, Hypervisors 508, and/or VMs 510 can represent or reside in a tenant or customer space. Tenant space can include workloads, services, applications, devices, networks, and/or resources that are associated with one or more clients or subscribers. Accordingly, traffic in Network Environment 500 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security and configuration information between tenants can be managed by Controllers 516, Servers 506, Leafs 504, etc.

Configurations in Network Environment 500 can be implemented at a logical level, a hardware level (e.g., physical), and/or both. For example, configurations can be implemented at a logical and/or hardware level based on endpoint or resource attributes, such as endpoint types and/or application groups or profiles, through a software-defined networking (SDN) framework (e.g., Application-Centric Infrastructure (ACI) or VMWARE NSX). To illustrate, one or more administrators can define configurations at a logical level (e.g., application or software level) through Controllers 516, which can implement or propagate such configurations through Network Environment 500. In some examples, Controllers 516 can be Application Policy Infrastructure Controllers (APICs) in an ACI framework. In other examples, Controllers 516 can be one or more management components for associated with other SDN solutions, such as NSX Managers.

Such configurations can define rules, policies, priorities, protocols, attributes, objects, etc., for routing and/or classifying traffic in Network Environment 500. For example, such configurations can define attributes and objects for classifying and processing traffic based on Endpoint Groups, Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 500, such as Leafs 504, Servers 506, Hypervisors 508, Controllers 516, etc. As previously explained, Network Environment 500 can be configured according to one or more particular SDN solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 500. Endpoints can have one or more attributes such as a VM name, guest OS name, a security tag, application profile, etc. Application configurations can be applied between EPGs, instead of endpoints directly, in the form of contracts. Leafs 504 can classify incoming traffic into different EPGs. The classification can be based on, for example, a network segment identifier such as a VLAN ID, VXLAN Network Identifier (VNID), NVGRE Virtual Subnet Identifier (VSID), MAC address, IP address, etc.

In some cases, classification in the ACI infrastructure can be implemented by ACI virtual edge (AVE), which can run on a host, such as a server, e.g. a vSwitch running on a server. For example, the AVE can classify traffic based on specified attributes, and tag packets of different attribute EPGs with different identifiers, such as network segment identifiers (e.g., VLAN ID). Finally, Leafs 504 can tie packets with their attribute EPGs based on their identifiers and enforce policies, which can be implemented and/or managed by one or more Controllers 516. Leaf 504 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, database VMs). DFW rules can be configured to implement policies for the specific security groups. To illustrate, in the context of the previous example, DFW rules can be configured to block HTTP traffic between web, application, and database security groups.

Returning now to FIG. 5, Network Environment 500 can deploy different hosts via Leafs 504, Servers 506, Hypervisors 508, VMs 510, Applications 512, and Controllers 516, such as VMWARE ESXi hosts, WINDOWS HYPER-V hosts, bare metal physical hosts, etc. Network Environment 500 may interoperate with a variety of Hypervisors 508, Servers 506 (e.g., physical and/or virtual servers), SDN orchestration platforms, etc. Network Environment 500 may implement a declarative model to allow its integration with application design and holistic network policy.

Controllers 516 can provide centralized access to fabric information, application configuration, resource configuration, application-level configuration modeling for a SDN infrastructure, integration with management systems or servers, etc. Controllers 516 can form a control plane that interfaces with an application plane via northbound APIs and a data plane via southbound APIs.

As previously noted, Controllers 516 can define and manage application-level model(s) for configurations in Network Environment 500. In some cases, application or device configurations can also be managed and/or defined by other components in the network. For example, a hypervisor or virtual appliance, such as a VM or container, can run a server or management tool to manage software and services in Network Environment 500, including configurations and settings for virtual appliances. In some examples, Controllers 516 can be an orchestrator (e.g., orchestrator appliance(s) 104 of FIG. 1) as described herein.

As illustrated above, Network Environment 500 can include one or more different types of SDN solutions, hosts, etc. For the sake of clarity and explanation purposes, various examples in the disclosure will be described with reference to an ACI framework, and Controllers 516 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" can refer to Servers 506 (e.g., physical or logical), Hypervisors 508, VMs 510, containers (e.g., Applications 512), etc., and can run or include any type of server or application solution. Non-limiting examples of "hosts" can include virtual switches or routers, such as distributed virtual switches (DVS), AVE nodes, vector packet processing (VPP)

switches; VCENTER and NSX MANAGERS; bare metal physical hosts; HYPER-V hosts; VMs; DOCKER Containers; etc.

Figure 6:
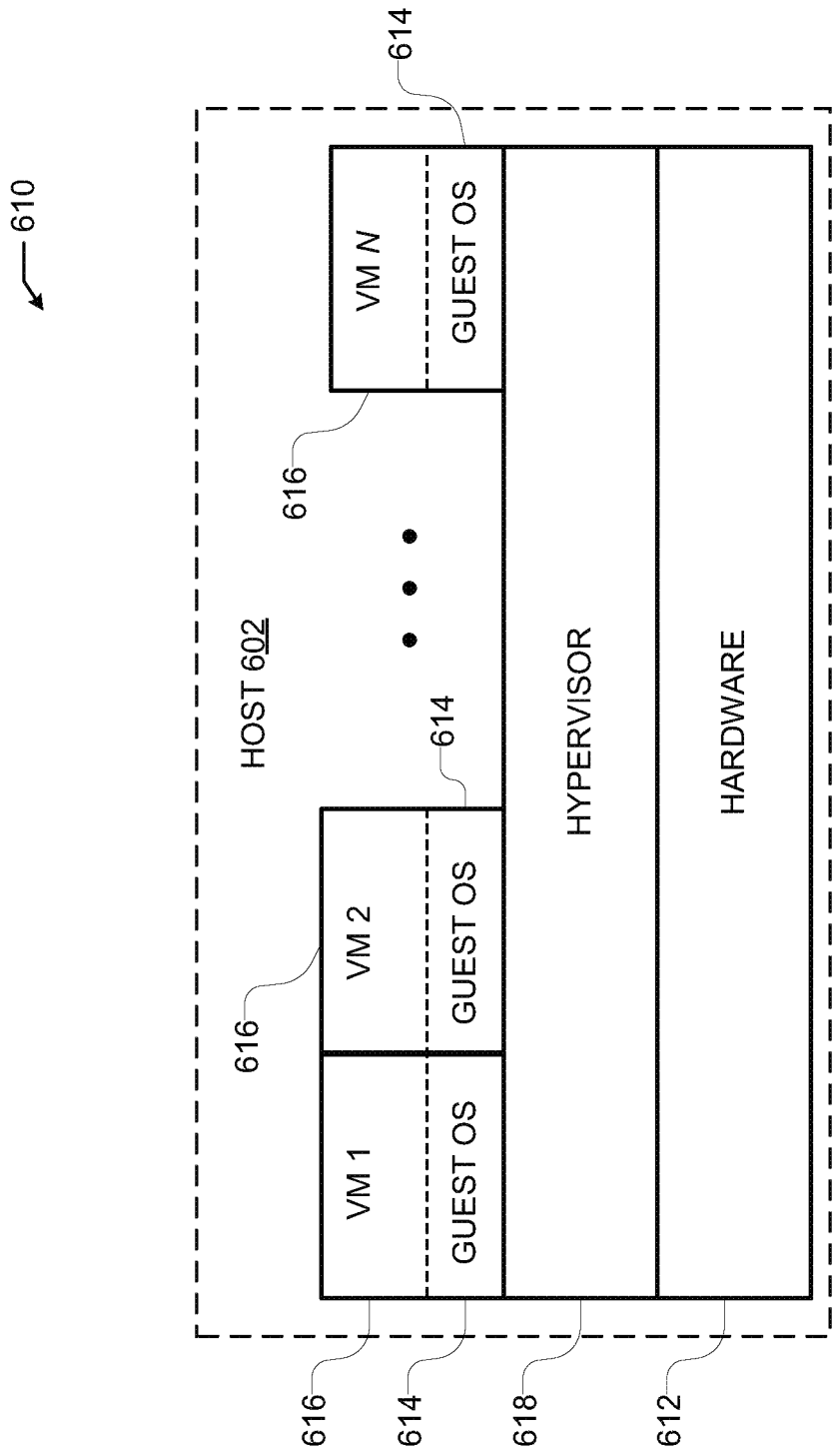
FIG. 6 illustrates an example schematic diagram of a virtual machine (VM) deployment, in accordance with an embodiment of the present disclosure.

FIG. 6 illustrates a schematic diagram of an example virtual machine (VM) deployment 610. In this example, the host 602 can include one or more VMs 616. The VMs 616 can be configured to run workloads like VNFs based on hardware resources 612 on the host 602. The VMs 616 can run on guest operating systems 614 on a virtual operating platform provided by a hypervisor 618. Each VM can run a respective guest operating system which can be the same or different as other guest operating systems associated with other VMs on the host 602. Moreover, each VM can have one or more network addresses, such as an internet protocol (IP) address. The VMs 616 can communicate with hypervisors 618 and/or any remote devices or networks using the one or more network addresses.

Hypervisors 618 can be a layer of software, firmware, and/or hardware that creates and runs VMs 616. For example, the hypervisors 618 can be virtual machine managers (VMM) for hosting and managing the VMs 616. The guest operating systems running on VMs 616 can share virtualized hardware resources created by the hypervisors 618. The virtualized hardware resources can provide the illusion of separate hardware components. Moreover, the virtualized hardware resources can perform as physical hardware components (e.g., memory, storage, processor, network interface, etc.), and can be driven by the hardware resources 612 on the host 602. Hypervisors 618 can have one or more network addresses, such as an internet protocol (IP) address, to communicate with other devices, components, or networks. For example, the hypervisors 618 can have a dedicated IP address which they can use to communicate with VMs 616 and/or any remote devices or networks.

Hardware resources 612 can provide the underlying physical hardware driving operations and functionalities provided by the host 602, hypervisors 618, and VMs 616. Hardware resources 612 can include, for example, one or more memory resources, one or more storage resources, one or more communication interfaces, one or more processors, one or more circuit boards, one or more extension cards, one or more power supplies, one or more antennas, one or more peripheral components, etc.

The host 602 can also include one or more host operating systems (not shown). The number of host operating system can vary by configuration. For example, some configurations can include a dual boot configuration that allows the host 602 to boot into one of multiple host operating systems. In other configurations, the host 602 may run a single host operating system. Host operating systems can run on hardware resources 612. In some cases, a hypervisor 618 can run on, or utilize, a host operating system on the host 602.

The host 602 can also have one or more network addresses, such as an internet protocol (IP) address, to communicate with other devices, components, or networks. For example, the host 602 can have an IP address assigned to a communications interface from hardware resources 612, which it can use to communicate with VMs 616, hypervisor 618, switches, and/or any remote devices or networks.

In some examples, the host 602 can run a distributed function router. For example, VMs 616 on host 602 can host and execute one or more functionalities of the distributed function router. In some cases, host 602 can also host multiple distributed function routers via VMs 616. For example, VM 1 can host and run a first distributed function router and VM 2 can host and run a second distributed function router. The first and second distributed function routers can be different function routers or may be instances of a same function router which can be configured for load balancing, failover, auto-scaling, etc.

As previously discussed, virtual networks are often in place of physical networks. These virtual networks can experience connectivity issues. For example, it is possible for a virtual router to be healthy, while simultaneously losing connectivity to an orchestrator and/or the rest of the virtual network. When this occurs, the branch sites on the virtual routers are unreachable and unrecoverable.

As such, a need exists to provide a software defined branch single internet protocol (IP) orchestration. For example, by providing a two factor virtual router health monitoring system that can increase the robustness of a single public IP address per branch site solution. Moreover, the orchestration system as described herein can provide the ability to integrate an orchestrator's secure agent with a Network Function Virtualization Infrastructure Software (NFVIS) to provide the orchestrator with the flexibility to utilize a policy that the orchestrator wants to enforce on a control connection (e.g., a datagram transport layer security (DTLS)).

The present technology provides systems and method can include establishing, by a controller, a secure tunnel agent to an orchestrator, generating, by the controller, a single IP address on a virtual router for a virtual branch site, and monitoring, by the controller, reachability of the single IP address on the virtual router.

Figure 7:
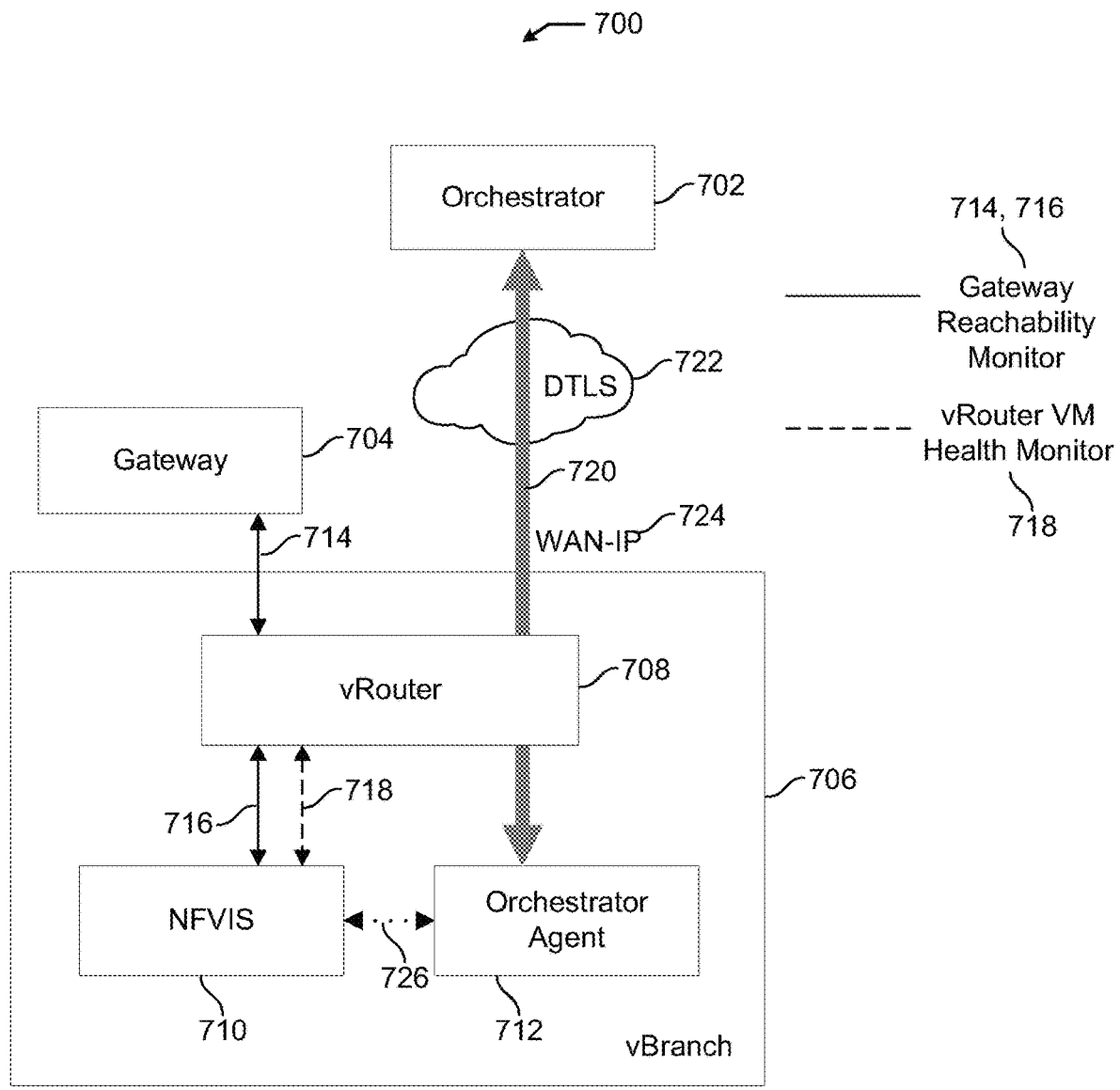
FIG. 7 illustrates an example diagram of a software defined branch single internet protocol orchestration, in accordance with an embodiment of the present disclosure.

FIG. 7 illustrates an example diagram of a software defined branch single internet protocol (IP) orchestration system 700, in accordance with an embodiment of the present disclosure. In some implementations, the single IP orchestration system 700 can include an orchestrator 702, a gateway 704, and a virtual branch ("vBranch") 706 (e.g., a host). In some examples, the virtual branch 706 can include a virtual router ("vRouter") 708, a Network Function Virtualization Infrastructure Software (NFVIS) 710, and an orchestrator agent 712.

In some implementations, the NFVIS 710 can provide flexibility and freedom of choice in deployment and platform options for an enterprise Network Function Virtualization (NFV) solution. By virtualizing and abstracting the network services from the underlying hardware, the NFVIS 710 can allow virtual network functions (VNFs) to be managed independently and to be provisioned dynamically. The NFVIS 710 can virtualize branch network services such as Integrated Services Virtual Router (e.g., vRouter 708), virtual WAN optimization, virtual adaptive security appliance (ASA), virtual Wireless LAN Controller, and Next-Generation Virtual Firewall.

In other implementations, the gateway 704 of the single IP orchestration system 700 can be communicatively coupled to the vRouter 708 via connection 714. The vRouter 708 of the single IP orchestration system 700 can also be communicatively coupled to the NFVIS 710 via connection 716. The connections 714, 716 can be utilized by the single IP orchestration system 700 to facilitate gateway 704 reachability-related data or information to the NFVIS 710. For example, the NFVIS 710 of the single IP orchestration system 700 can monitor the gateway 704 connection 714, 716 by receiving data from the gateway 704 that indicates the reachability status or condition of the gateway 704 connection 714, 716 via the vRouter 708. In some examples, the NFVIS 710 of the single IP orchestration system 700 can provide (e.g., ping) a request for reachability-related data to the gateway 704 using the connections 714, 716 via the vRouter 708. In response to the request for reachability-related data from the gateway 704, the gateway 704 can provide reachability-related data of the gateway 704 including the quality, strength, stability, speed, etc. to the NFVIS 710 via the vRouter 708. With the reachability-related data of the gateway 704, the NFVIS 710 can determine whether connectivity with the gateway 704 is unreachable or unrecoverable.

In some implementations, the vRouter 708 of the single IP orchestration system 700 can further be communicatively coupled to the NFVIS 710 via connection 718. The connection 718 can be utilized by the single IP orchestration system 700 to facilitate vRouter 708 virtual machine health-related data or information to the NFVIS 710. For example, the NFVIS 710 of the single IP orchestration system 700 can monitor connectivity with the vRouter 708 via connection 718 by receiving data from the vRouter 708 that indicates the status or condition of the vRouter 708 connection 718. In some examples, the NFVIS 710 of the single IP orchestration system 700 can provide (e.g., ping) a request for health-related data to the vRouter 708 using the connection 718. In response to the request for health-related data from the vRouter 708, the vRouter 708 can provide health-related data of the vRouter 708 including the quality, strength, stability, speed, etc. to the NFVIS 710. With the health-related data of the vRouter 708, the NFVIS 710 can determine whether connectivity with the vRouter 708 is unreachable or unrecoverable.

In other implementations, the NFVIS 710 of the single IP orchestration system 700 can be communicatively coupled to the orchestrator agent 712 via connection 726. In some examples, the NFVIS 710 of the single IP orchestration system 700 can provide data or information to the orchestrator agent 712 including the reachability-related data of the gateway 704, the health-related data of the vRouter 708, and any determinations of unreachable or unrecoverable connectivity with the gateway 704 and the vRouter 708.

In some implementations, the orchestrator agent 712 of the single IP orchestration system 700 can be communicatively coupled to the orchestrator 702 via connection 720. In some examples, the vRouter 708 may be an intermediary coupled connection between the orchestrator 702 and the orchestrator agent 712 of the single IP orchestration system 700. In other examples, the connection 720 can include utilizing a wide area network (WAN)-IP 724 via a datagram transport layer security (DTLS) tunnel connection 722 to communicatively couple the orchestrator 702 and the vBranch 706.

In other examples, the NFVIS 710 can be a hypervisor in the virtual branch 706. The NFVIS 710 can also utilize the orchestrator agent 712 to establish a secure control connection (e.g., via the connection 720) to the orchestrator 702. The NFVIS 710 can utilize a single public IP address (e.g., the WAN-TP 724) per branch site (e.g., vBranch 706). By utilizing the orchestrator secure tunnel agent 712, the single IP orchestration system 700 can provide a seamless tunnel connection (e.g., the connection 720) between the orchestrator 702 and the vBranch 706/the orchestrator agent 712 regardless of whether the publish IP address (e.g., WAN-TP address 724) is being used by the NFVIS 710 or the vRouter 708. The NFVIS 710 can further utilize two factors for monitoring vRouter health. For example, the NFVIS 710 can monitor both vRouter health and vRouter WAN connectivity. When the NFVIS 710 determines that the vRouter 708 is "unhealthy" based on the above-mentioned two factors, the NFVIS 710 can take back the public IP address (e.g., WAN-TP 724) from the vRouter 708 and allow the orchestrator secure agent 712 to re-establish a control connection (e.g., connection 720) with the orchestrator 702. Thereafter, the orchestrator 702 can continue managing the branch site (e.g., vBranch 706) from the NFVIS 710, directly. The NFVIS 710 can also support a flexible template-based vRouter day 0 configuration push from the orchestrator 702 to support site specific configuration for the vRouter 708.

In some implementations, after enabling single IP mode of the single IP orchestration system 700, the WAN-IP address 724 can be released. For example, the vRouter 708 can utilize the WAN-IP address 724 and act as a hot-spot for the NFVIS 710. The NFVIS 710 of the single IP orchestration system 700 can also re-establish the DTLS tunnel 722 using int-mgmt-net-br interfaces. The NFVIS 710 of the single IP orchestration system 700 can further start a process to ping an external gateway (e.g., the gateway 704), periodically. If the external gateway 704 is not reachable for a long enough period of time, the single IP orchestration system 700 can shut down a corresponding virtual machine and reclaim the WAN-IP 724 and re-establish the DTLS tunnel 720 with a vManager (e.g., the orchestrator 702).

Figure 8:
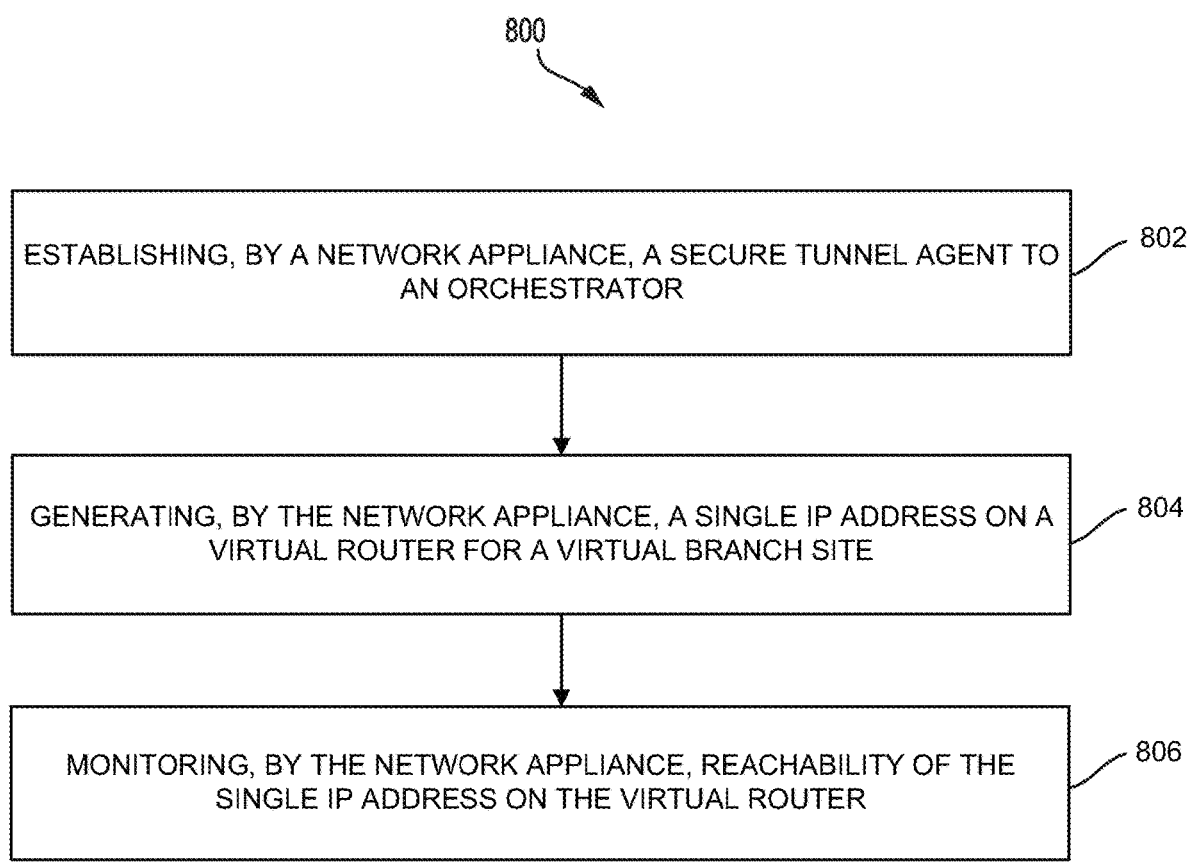
FIG. 8 illustrates an example process for a software defined branch single internet protocol orchestration, in accordance with an embodiment of the present disclosure.

FIG. 8 illustrates an example method 800 for software defined branch single IP orchestration. Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, method 800 includes establishing, by a network appliance, a secure tunnel agent to an orchestrator at block 802. For example, the network orchestrator appliance(s) 104 illustrated in FIG. 1 or NFVIS may establish a secure tunnel agent to an orchestrator.

According to some examples, method 800 includes generating, by the network appliance, a single IP address on a virtual router for a virtual branch site at block 804. For example, the network orchestrator appliance(s) 104 illustrated in FIG. 1 or NFVIS may generate a single IP address on a virtual router for a virtual branch site.

According to some examples, method 800 includes monitoring, by the network appliance, reachability of the single IP address on the virtual router at block 806. For example, the network orchestrator appliance(s) 104 illustrated in FIG. 1 or NFVIS may monitor reachability of the single IP address on the virtual router.

According to some examples, method 800 includes determining, by the network appliance, that the reachability of the single IP address on the virtual router is lost. For example, the network orchestrator appliance(s) 104 illustrated in FIG. 1 or NFVIS may determine that the reachability of the single IP address on the virtual router is lost.

According to some examples, method 800 includes reallocating, by the network appliance, the single IP address. For example, the network orchestrator appliance(s) 104 illustrated in FIG. 1 or NFVIS may reallocate the single IP address.

According to some examples, method 800 includes managing, by the orchestrator, the virtual branch site when connectivity with the virtual router via the single IP address is lost. For example, the network orchestrator appliance(s) 104 illustrated in FIG. 1 may manage the virtual branch site when connectivity with the virtual router via the single IP address is lost.

According to some examples, method 800 includes pushing, from the orchestrator, a site specific configuration to the virtual branch site. For example, the network orchestrator appliance(s) 104 illustrated in FIG. 1 may push a site specific configuration to the virtual branch site.

According to some examples, the network appliance can be a Network Function Virtualization Infrastructure Software (NFVIS). The monitoring of the reachability of the single IP address on the virtual router can include receiving, by the NFVIS, gateway reachability data from a gateway via the virtual router. The monitoring of the reachability of the single IP address on the virtual router can include receiving, by the NFVIS, health-related data of the virtual router.

Figure 9:
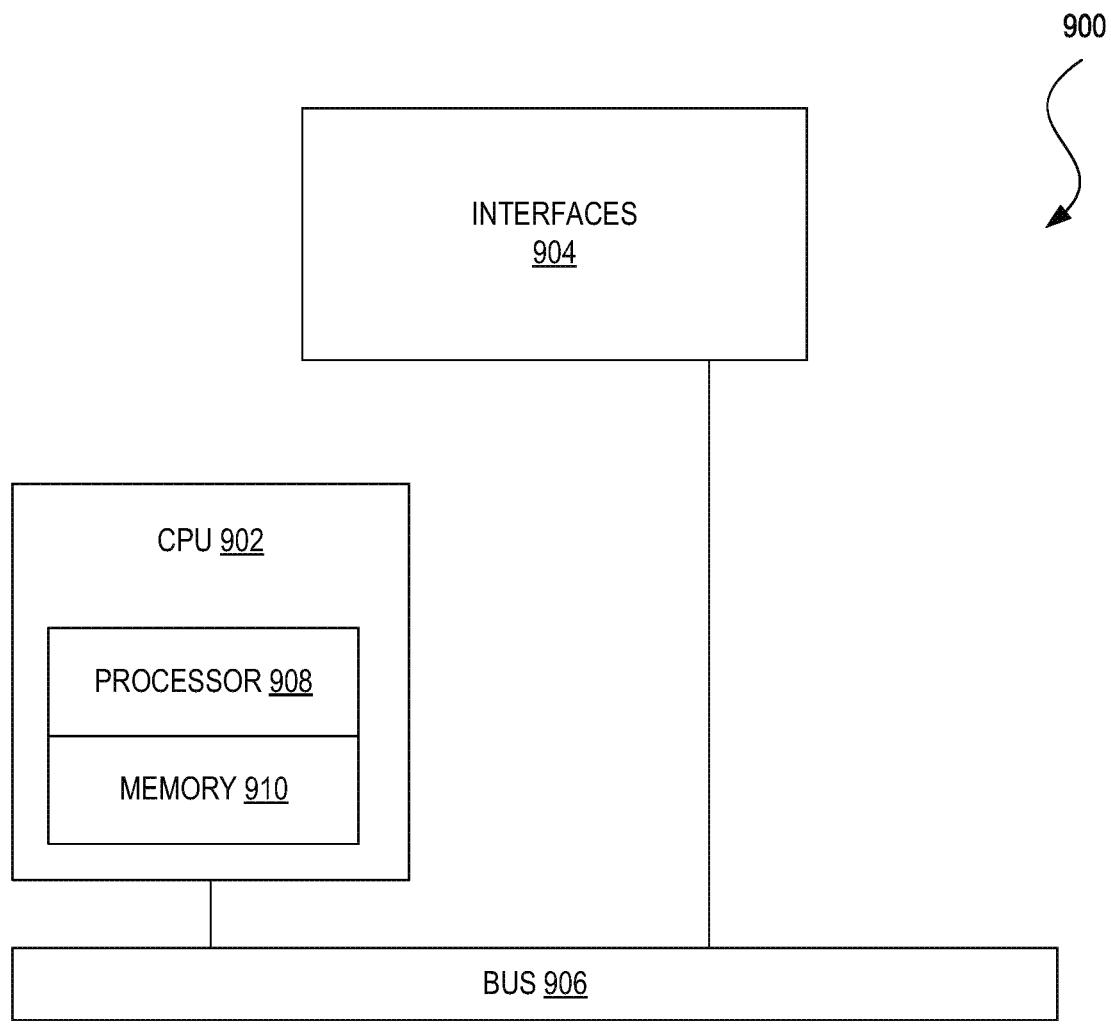
FIG. 9 illustrates an example of a network device, in accordance with some embodiments of the present disclosure.

FIG. 9 further illustrates an example of a network device 900 (e.g., switch, router, network appliance, etc.). The network device 900 can include a master central processing unit (CPU) 902, interfaces 904, and a bus 906 (e.g., a PCI bus). When acting under the control of appropriate software or firmware, the CPU 902 can be responsible for executing packet management, error detection, and/or routing functions. The CPU 902 preferably accomplishes all these functions under the control of software including an operating system and any appropriate applications software. The CPU 902 may include one or more processors 908 such as a processor from the Motorola family of microprocessors or the MIPS family of microprocessors. In an alternative embodiment, the processor 908 can be specially designed hardware for controlling the operations of the network device 900. In an embodiment, a memory 910 (such as non-volatile RAM and/or ROM) can also form part of the CPU 902. However, there are many different ways in which memory could be coupled to the system.

An enterprise network can address the above and other security requirements with certain enhancements. For example, the enterprise network can create an International Mobile Subscriber Identity (IMSI) whitelist in in an Authentication, Authorization, and Accounting (AAA) server. In addition to SIM authentication, the enterprise network can maintain the AAA server containing the IMSIs of enterprise-provisioned devices. After initial authentication, a Packet Data Network Gateway (PGW) can validate the IMSI with the local device. The enterprise can also create a mapping of IMSIs to International Mobile Equipment Identities (IMEIs) for (non-embedded) SIM cards. The cloud-hosted authentication system can maintain a mapping between IMSIs and IMEIs. This mapping can be controlled by the enterprise network. This can ensure a binding between device and SIM. After authentication, the mobile core can request the IMEI. It can further check if the IMEI maps to IMSI. The enterprise network can also deploy Virtual Routing and Forwarding (VRFs) instances based on device policy. The PGW can tunnel user traffic to specific VRFs.

The interfaces 904 can be provided as interface cards (sometimes referred to as line cards). The interfaces 904 can control the sending and receiving of data packets over the network and sometimes support other peripherals used with the network device 900. Among the interfaces that may be provided are Ethernet interfaces, frame relay interfaces, cable interfaces, Digital Subscriber Line (DSL) interfaces, token ring interfaces, and the like. In addition, various very high-speed interfaces may be provided such as a fast token ring interface, wireless interface, Ethernet interface, Gigabit Ethernet interface, Asynchronous Transfer Mode (ATM) interface, High-Speed Serial Interface (HSSI), Packet Over SONET (POS) interface, Fiber Distributed Data Interface (FDDI), and the like. The interfaces 904 may include ports appropriate for communication with the appropriate media.

In some cases, the interfaces 904 may also include an independent processor and, in some instances, volatile RAM. The independent processors may control communication intensive tasks such as packet switching, media control, and management. By providing separate processors for the communication intensive tasks, the interfaces 904 may allow the CPU 902 to efficiently perform routing computations, network diagnostics, security functions, and so forth.

Although the system shown in FIG. 9 is an example of a network device of an embodiment, it is by no means the only network device architecture on which the subject technology can be implemented. For example, an architecture having a single processor that can handle communications as well as routing computations and other network functions, can also be used. Further, other types of interfaces and media may also be used with the network device 900.

Regardless of the network device's configuration, it may employ one or more memories or memory modules (including the memory 910) configured to store program instructions for general-purpose network operations and mechanisms for roaming, route optimization, and routing functions described herein. The program instructions may control the operation of an operating system and/or one or more applications. The memory or memories may also be configured to store tables such as mobility binding, registration, and association tables.

Figure 10A:
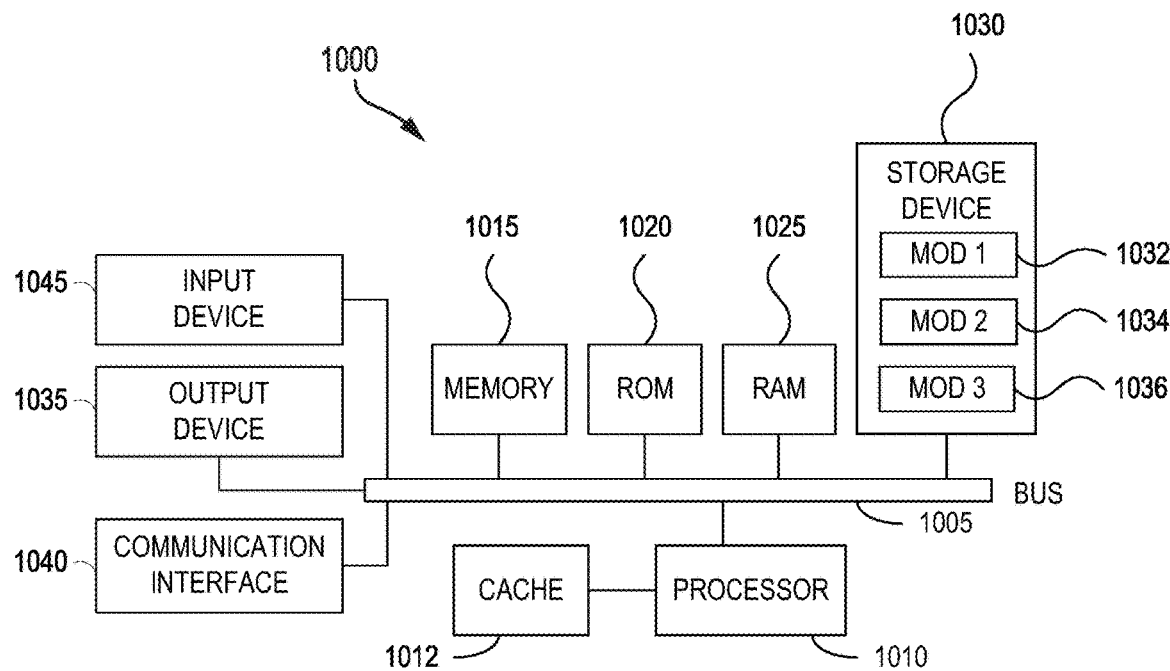
FIGS. 10A and 10B illustrate examples of systems, in accordance with some embodiments of the present disclosure.
Figure 10B:
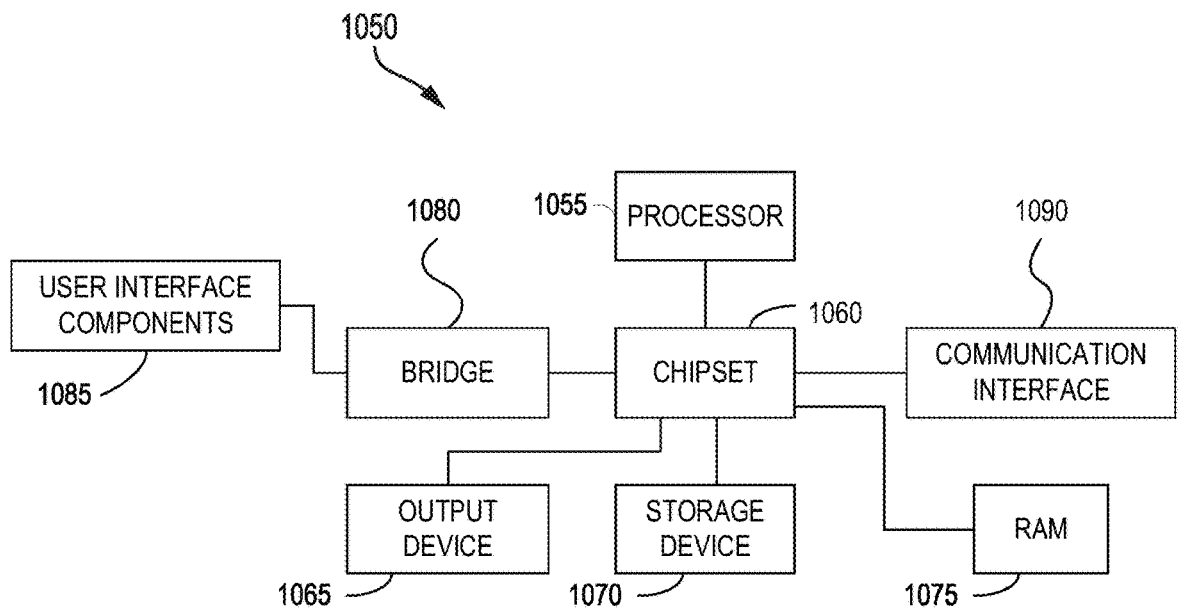

FIGS. 10A and 10B illustrate systems in accordance with various embodiments. The more appropriate system will be apparent to those of ordinary skill in the art when practicing the various embodiments. Persons of ordinary skill in the art will also readily appreciate that other systems are possible.

FIG. 10A illustrates an example of a bus computing system 1000 wherein the components of the system are in electrical communication with each other using a bus 1005. The computing system 1000 can include a processing unit (CPU or processor) 1010 and a system bus 1005 that may couple various system components including the system memory 1015, such as read only memory (ROM) 1020 and random access memory (RAM) 1025, to the processor 1010. The computing system 1000 can include a cache 1012 of high-speed memory connected directly with, in close proximity to, or integrated as part of the processor 1010. The computing system 1000 can copy data from the memory 1015, ROM 1020, RAM 1025, and/or storage device 1030 to the cache 1012 for quick access by the processor 1010. In this way, the cache 1012 can provide a performance boost that avoids processor delays while waiting for data. These and other modules can control the processor 1010 to perform various actions. Other system memory 1015 may be available for use as well. The memory 1015 can include multiple different types of memory with different performance characteristics. The processor 1010 can include any general purpose processor and a hardware module or software module, such as module 1 1032, module 2 1034, and module 3 1036 stored in the storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing system 1000, an input device 1045 can represent any number of input mechanisms, such as a microphone for speech, a touch-protected screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing system 1000. The communications interface 1040 can govern and manage the user input and system output. There may be no restriction on operating on any particular hardware arrangement and therefore the basic features here may easily be substituted for improved hardware or firmware arrangements as they are developed.

The storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memory, read only memory, and hybrids thereof.

As discussed above, the storage device 1030 can include the software modules 1032, 1034, 1036 for controlling the processor 1010. Other hardware or software modules are contemplated. The storage device 1030 can be connected to the system bus 1005. In some embodiments, a hardware module that performs a particular function can include a software component stored in a computer-readable medium in connection with the necessary hardware components, such as the processor 1010, bus 1005, output device 1035, and so forth, to carry out the function.

FIG. 10B illustrates an example architecture for a chipset computing system 1050 that can be used in accordance with an embodiment. The computing system 1050 can include a processor 1055, representative of any number of physically and/or logically distinct resources capable of executing software, firmware, and hardware configured to perform identified computations. The processor 1055 can communicate with a chipset 1060 that can control input to and output from the processor 1055. In this example, the chipset 1060 can output information to an output device 1065, such as a display, and can read and write information to storage device 1070, which can include magnetic media, solid state media, and other suitable storage media. The chipset 1060 can also read data from and write data to RAM 1075. A bridge 1080 for interfacing with a variety of user interface components 1085 can be provided for interfacing with the chipset 1060. The user interface components 1085 can include a keyboard, a microphone, touch detection and processing circuitry, a pointing device, such as a mouse, and so on. Inputs to the computing system 1050 can come from any of a variety of sources, machine generated and/or human generated.

The chipset 1060 can also interface with one or more communication interfaces 1090 that can have different physical interfaces. The communication interfaces 1090 can include interfaces for wired and wireless LANs, for broadband wireless networks, as well as personal area networks. Some applications of the methods for generating, displaying, and using the technology disclosed herein can include receiving ordered datasets over the physical interface or be generated by the machine itself by the processor 1055 analyzing data stored in the storage device 1070 or the RAM 1075. Further, the computing system 1050 can receive inputs from a user via the user interface components 1085 and execute appropriate functions, such as browsing functions by interpreting these inputs using the processor 1055.

It will be appreciated that computing systems 1000 and 1050 can have more than one processor 1010 and 1055, respectively, or be part of a group or cluster of computing devices networked together to provide greater processing capability.

For clarity of explanation, in some instances the various embodiments may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1: A method comprising: establishing, by a controller, a secure tunnel agent to an orchestrator; generating, by the controller, a single IP address on a virtual router for a virtual branch site; and monitoring, by the controller, reachability of the single IP address on the virtual router.

Aspect 2: The method of Aspect 1, further comprising: determining, by the controller, that the reachability of the single IP address on the virtual router is lost; and reallocating, by the controller, the single IP address.

Aspect 3: The method of any of Aspects 1 to 2, further comprising: managing, by the orchestrator, the virtual branch site when connectivity with the virtual router via the single IP address is lost.

Aspect 4: The method of any of Aspects 1 to 3, further comprising: pushing, from the orchestrator, a site specific configuration to the virtual branch site.

Aspect 5: The method of any of Aspects 1 to 4, wherein the network appliance is a Network Function Virtualization Infrastructure Software (NFVIS).

Aspect 6: The method of any of Aspects 1 to 5, wherein the monitoring of the reachability of the single IP address on the virtual router includes receiving, by the NFVIS, gateway reachability data from a gateway via the virtual router.

Aspect 7: The method of any of Aspects 1 to 6, wherein the monitoring of the reachability of the single IP address on the virtual router includes receiving, by the NFVIS, health-related data of the virtual router.

Aspect 8: A system comprising: one or more processors; and at least one computer-readable storage medium having stored therein instructions which, when executed by the one or more processors, cause the system to: establish, by a network appliance, a secure tunnel agent to an orchestrator, generate, by the network appliance, a single IP address on a virtual router for a virtual branch site, and monitor, by the network appliance, reachability of the single IP address on the virtual router.

Aspect 9: The system of Aspect 8, wherein the instructions which, when executed by the one or more processors, cause the system to: determine, by the network appliance, that the reachability of the single IP address on the virtual router is lost; and reallocate, by the network appliance, the single IP address.

Aspect 10: The system of any of Aspects 8 to 9, wherein the instructions which, when executed by the one or more processors, cause the system to: manage, by the orchestrator, the virtual branch site when connectivity with the virtual router via the single IP address is lost.

Aspect 11: The system of any of Aspects 8 to 10, wherein the instructions which, when executed by the one or more processors, cause the system to: push, from the orchestrator, a site specific configuration to the virtual branch site.

Aspect 12: The system of any of Aspects 8 to 11, wherein the network appliance is a Network Function Virtualization Infrastructure Software (NFVIS).

Aspect 13: The system of any of Aspects 8 to 12, wherein the monitored reachability of the single IP address on the virtual router includes receiving, by the NFVIS, gateway reachability data from a gateway via the virtual router.

Aspect 14: The system of any of Aspects 8 to 13, wherein the monitored reachability of the single IP address on the virtual router includes receiving, by the NFVIS, health-related data of the virtual router.

Aspect 15: A non-transitory computer-readable storage medium comprising: instructions stored on the non-transitory computer-readable storage medium, the instructions, when executed by one or more processors, cause the one or more processors to: establish, by a network appliance, a secure tunnel agent to an orchestrator; generate, by the network appliance, a single IP address on a virtual router for a virtual branch site; and monitor, by the network appliance, reachability of the single IP address on the virtual router.

Aspect 16: The computer readable medium of Aspect 15, wherein the instructions, when executed by the one or more processors, cause the one or more processors to: determine, by the network appliance, that the reachability of the single IP address on the virtual router is lost; and reallocate, by the network appliance, the single IP address.

Aspect 17: The computer readable medium of any of Aspects 15 to 16, wherein the instructions, when executed by the one or more processors, cause the one or more processors to: manage, by the orchestrator, the virtual branch site when connectivity with the virtual router via the single IP address is lost.

Aspect 18: The computer readable medium of any of Aspects 15 to 17, wherein the instructions, when executed by the one or more processors, cause the one or more processors to: push, from the orchestrator, a site specific configuration to the virtual branch site.

Aspect 19: The computer readable medium of any of Aspects 15 to 18, wherein the network appliance is a Network Function Virtualization Infrastructure Software (NFVIS), the monitored reachability of the single IP address on the virtual router including receiving, by the NFVIS, gateway reachability data from a gateway via the virtual router.

Aspect 20: The computer readable medium of any of Aspects 15 to 19, wherein the network appliance is a Network Function Virtualization Infrastructure Software (NFVIS), the monitored reachability of the single IP address on the virtual router including receiving, by the NFVIS, health-related data of the virtual router.

What is claimed is:

1. A method comprising:
   establishing, by a network appliance implemented through a virtualized infrastructure of a virtual branch site, a secure tunnel agent to an orchestrator, the secure tunnel agent and the orchestrator being components of the virtualized infrastructure of the virtual branch site;
   generating, by the network appliance, a single IP address on a virtual router for the virtual branch site;
   monitoring, by the network appliance, reachability of the single IP address on the virtual router; and
   controlling use of the single IP address between the network appliance and the virtual router based on the reachability of the single IP address on the virtual router to maintain a connection between the orchestrator and the virtual branch site through the secure tunnel agent when the virtual router is unreachable,
   wherein the network appliance is a Network Function Virtualization Infrastructure Software (NFVIS), the monitoring of the reachability of the single IP address on the virtual router includes receiving, by the NFVIS, gateway reachability data from a gateway via the virtual router.

2. The method of claim 1, further comprising:
   determining, by the network appliance, that the reachability of the single IP address on the virtual router is lost; and
   reallocating, by the network appliance, the single IP address.

3. The method of claim 2, further comprising:
  managing, by the orchestrator, the virtual branch site when connectivity with the virtual router via the single IP address is lost.

4. The method of claim 1, further comprising:
  pushing, from the orchestrator, a site specific configuration to the virtual branch site.

5. The method of claim 1, wherein the monitoring of the reachability of the single IP address on the virtual router includes receiving, by the NFVIS, health-related data of the virtual router.

6. A system comprising:
  one or more processors; and
  at least one computer-readable storage medium having stored therein instructions which, when executed by the one or more processors, cause the system to:
  establish, by a network appliance implemented through a virtualized infrastructure of a virtual branch site, a secure tunnel agent to an orchestrator, the secure tunnel agent and the orchestrator being components of the virtualized infrastructure of the virtual branch site;
  generate, by the network appliance, a single IP address on a virtual router for the virtual branch site;
  monitor, by the network appliance, reachability of the single IP address on the virtual router; and
  control use of the single IP address between the network appliance and the virtual router based on the reachability of the single IP address on the virtual router to maintain a connection between the orchestrator and the virtual branch site through the secure tunnel agent when the virtual router is unreachable,
  wherein the network appliance is a Network Function Virtualization Infrastructure Software (NFVIS), the monitored reachability of the single IP address on the virtual router includes receiving, by the NFVIS, gateway reachability data from a gateway via the virtual router.

7. The system of claim 6, wherein the instructions which, when executed by the one or more processors, cause the system to:
  determine, by the network appliance, that the reachability of the single IP address on the virtual router is lost; and
  reallocate, by the network appliance, the single IP address.

8. The system of claim 7, wherein the instructions which, when executed by the one or more processors, cause the system to:
  manage, by the orchestrator, the virtual branch site when connectivity with the virtual router via the single IP address is lost.

9. The system of claim 6, wherein the instructions which, when executed by the one or more processors, cause the system to:
  push, from the orchestrator, a site specific configuration to the virtual branch site.

10. The system of claim 6, wherein the monitored reachability of the single IP address on the virtual router includes receiving, by the NFVIS, health-related data of the virtual router.

11. A non-transitory computer-readable storage medium comprising: instructions stored on the non-transitory computer-readable storage medium, the instructions, when executed by one or more processors, cause the one or more processors to:
  establish, by a network appliance implemented through a virtualized infrastructure of a virtual branch site, a secure tunnel agent to an orchestrator, the secure tunnel agent and the orchestrator being components of the virtualized infrastructure of the virtual branch site;
  generate, by the network appliance, a single IP address on a virtual router for the virtual branch site;
  monitor, by the network appliance, reachability of the single IP address on the virtual router; and
  control use of the single IP address between the network appliance and the virtual router based on the reachability of the single IP address on the virtual router to maintain a connection between the orchestrator and the virtual branch site through the secure tunnel agent when the virtual router is unreachable,
  wherein the network appliance is a Network Function Virtualization Infrastructure Software (NFVIS), the monitored reachability of the single IP address on the virtual router including receiving, by the NFVIS, gateway reachability data from a gateway via the virtual router.

12. The non-transitory computer-readable storage medium of claim 11, wherein the instructions, when executed by the one or more processors, cause the one or more processors to:
  determine, by the network appliance, that the reachability of the single IP address on the virtual router is lost; and
  reallocate, by the network appliance, the single IP address.

13. The non-transitory computer-readable storage medium of claim 12, wherein the instructions, when executed by the one or more processors, cause the one or more processors to:
  manage, by the orchestrator, the virtual branch site when connectivity with the virtual router via the single IP address is lost.

14. The non-transitory computer-readable storage medium of claim 11, wherein the instructions, when executed by the one or more processors, cause the one or more processors to:
  push, from the orchestrator, a site specific configuration to the virtual branch site.

15. The non-transitory computer-readable storage medium of claim 11, wherein the monitored reachability of the single IP address on the virtual router including receiving, by the NFVIS, health-related data of the virtual router.

* * * * *